Oct. 2, 1934.  F. LÜTHY  1,975,646
BEARING FOR SPINDLES
Filed Sept. 19, 1932
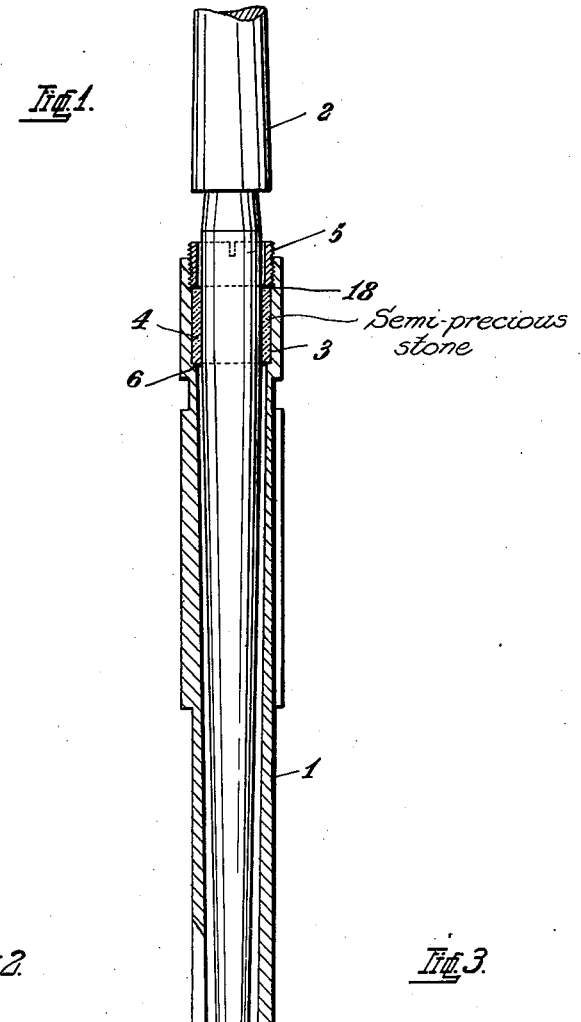
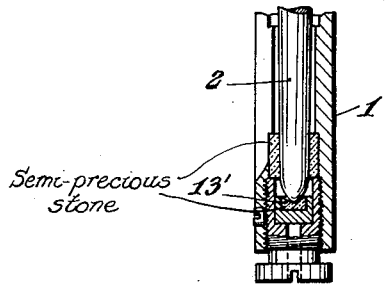
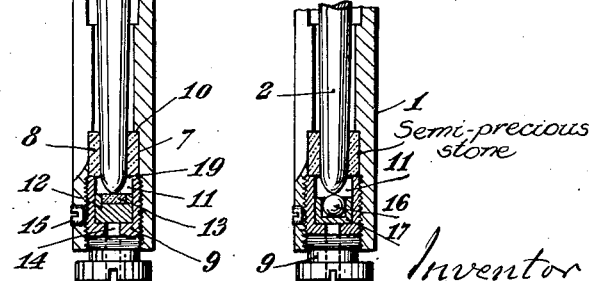
Inventor
Fritz Lüthy Patented Oct. 2, 1934

1,975,646

UNITED STATES PATENT OFFICE 1,975,646

BEARING FOR SPINDLES

Fritz Lüthy, Thoune, Switzerland

Application September 19, 1932, Serial No. 633,811
In Switzerland September 25, 1931

1 Claim. (Cl. 308—159)

My invention relates to bearings comprising semi-precious stones for spindles.

In watches and clocks it is well known to make bearings of precious stones for the pivot pins and spindles, for preventing rapid wear and for reducing friction to a minimum.

In spinning, twisting and other textile machines comprising high-speed spindles many attempts have been made to reduce the wear and friction of bearings and to diminish the consumption of energy in them. For example, it has been proposed to make spindle foot-step bearings, such as are known as "spindle cups" ("Spindeltöpfchen") of glass. Glass is a manufactured amorphous, brittle mass, the surface of which is always harder than its interior due to the mass cooling non-uniformly. Such irregularity of hardness can best be proved by inspecting a piece of glass in polarized light. For this reason glass bearings, particularly those formed as journal or radial bearings, cannot be used as they not only wear unevenly, but also very easily crack and fracture during manufacture and in use, owing to the brittleness of the glass.

One object of the present invention is to enable the many years' experience gained with watches, clocks and scientific instruments to be used in the textile industry and in any other art making use of high-speed spindles.

According to the invention, the bearings for such spindles, whether they are radial, journal, axial or foot-step bearings, are made of stone, e. g. semi-precious stones. Every semi-precious stone is a crystallization product which is perfectly homogeneous and of equal hardness throughout. Consequently, this material is much tougher than glass, can be more readily worked, has the property that it is not attacked or worn unevenly at all by friction at the bearing, and is relatively insensitive to shock. A semi-precious stone bearing consequently has many advantages as compared with glass bearings.

According to a feature of the invention the bearing member composed of semi-precious stone may lie between elastic members in a metal body for the following reasons. A perforated stone in the plate of a watch is not inserted between members screwed one on another, but is placed in a mount whose edge is then laid by a precision tool over the margin of the stone. In the textile or machine industry such precision tools cannot be used because the material for the mount as a rule is iron or steel in such machines, and not a particular brass alloy. In the machine industry the mount consists of parts that can be screwed together, and engineers' hands which have become less sensitive owing to hard work have not the delicate sense of touch which is necessary for deciding when the member screwed in has been seated on the bearing body composed of semi-precious stone. Consequently, in order to prevent the stone from being broken, when it is being inserted in the bearing, owing to screwing up the latter too tightly, the improved bearing according to the present invention comprising a semi-precious stone has the latter inserted between elastic members or intermediate parts of the bearing.

It is known to arrange a yielding cushion between the cup and its support in a foot-step bearing comprising a steel cup, but the sole purpose of such a cushion was to increase the friction between the floating cup and its support.

Several embodiments of the invention are diagrammatically illustrated by way of example in the accompanying drawing, wherein:—

Figure 1 is a longitudinal section showing radial and axial spinning-spindle bearings according to the invention, and Figures 2 and 3 are like views of the two different forms of foot-step or thrust bearings according to the invention.

Like reference characters designate like parts in all the views.

Referring first to Figure 1, a sleeve 1 surrounding a spinning spindle 2 is usually immersed in oil and has at 3 an opening for an upper bearing bushing 4 which in this case consists of a semi-precious stone. A sleeve 5 screwed into the sleeve 1 serves to hold the bushing 4 in position against a shoulder at the inner end of the opening 3.

A lower bearing bushing 8 of semi-precious stone is accommodated in an opening or annular recess 7 in the lower part of the sleeve 1, which bushing 8 is supported by a screw 9 that is screwed into the sleeve 1 and holds the upper end of the bushing 8 against a shoulder 10 in the sleeve 1. To prevent the screw 9 from working loose a grub screw 15 may be inserted into the sleeve 1. In this embodiment of the invention the screw 9 is also used for accommodating a thrust or foot-step bearing.

For this purpose, the upper part 11 of the screw 9 is formed hollow like a cup and contains a foot-step bearing member or cup 12. This cup 12 contains either a thrust plate 13 of precious or semi-precious stone or, as shown in Figure 3, a steel ball 16.

As shown in Figure 2, the thrust plate 13 may be provided with a cup-shaped recess 13′ into which the pointed rounded end of the spindle 2 enters.

In order that the thrust-plate 13 consisting of precious or semi-precious stone shall not be so readily damaged when placing a cap or the like on the spindle 2, a spring or other convenient intermediate member of yielding material may be arranged below the cup 12. Further, in order that the radial bearings 4 and 8 consisting of semi-precious stone shall not be fractured, cracked or broken by screwing into position the sleeve 5 or the screw 9, yielding rings or washers are preferably arranged at 18 and 19. These will also be provided if stone bearings comprising more than one part are used and are secured in position in known manner by bearing cover plates. Further, semi-precious stone bearings and metal bearings may be employed together in the same machine. The term "precious stone" used herein refers to stones such as diamond, ruby, sapphire, tourmaline, topaz and the term "semi-precious stone" used herein refers to stones such as chalcedon, agate, onyx, rock-crystal, amber.

I claim:—

In combination, a sleeve counterbored to receive a journal bearing and to provide a shoulder to limit inward endwise movement of the bearing, a journal bearing of semi-precious stone disposed within the counterbored portion of said sleeve, a cup-like member threaded into the sleeve and providing a shoulder at its inner end to limit outward endwise movement of the bearing, and an end thrust bearing of semi-precious stone contained within said cup-like member.

FRITZ LÜTHY.